US005416846A

United States Patent [19]

Tamura et al.

[11] Patent Number: 5,416,846

[45] Date of Patent: May 16, 1995

[54] NOISE CONTROL SYSTEM AND METHOD

[75] Inventors: Tadashi Tamura, Toyonaka; Kenichi Terai, Osaka; Hiroyuki Hashimoto, Daito; Yasutoshi Nakama, Ikoma, all of Japan

[73] Assignee: Matsushita Electric Industrial Co., Ltd., Osaka, Japan

[21] Appl. No.: 249,158

[22] Filed: May 25, 1994

[30] Foreign Application Priority Data

May 25, 1993 [JP] Japan .................................. 5-122520

[51] Int. Cl.[6] .................................................. H04B 3/00

[52] U.S. Cl. .......................................... 381/71; 381/94

[58] Field of Search .................................... 381/74, 94; 361/690-698

[56] References Cited

U.S. PATENT DOCUMENTS 4,956,867 9/1991 Zurek et al. ........................ 381/94.1
5,245,664 9/1993 Kinoshite et al. .................... 381/71

FOREIGN PATENT DOCUMENTS 4-136996 5/1992 Japan .
4-190396 7/1992 Japan .

*Primary Examiner*—Stephen Brinich
*Assistant Examiner*—Jerome Grant, III
*Attorney, Agent, or Firm*—Ratner & Prestia

[57] ABSTRACT

The noise control system of this invention includes: a noise detector for detecting a noise generated from a noise source in order to output a noise detection signal; an adaptive filter portion for outputting a control signal based on the noise detection signal so as to cancel the noise; a control loudspeaker for receiving the control signal that is to radiate a control sound to a predetermined region; and an error detector for detecting a residual error of the noise and the control sound in the predetermined region, wherein the adaptive filter portion includes: an adaptive filter for receiving the noise detection signal and processing the noise detection signal to output a control signal; an IIR filter section for receiving the noise detection signal, performing a filtering process to the noise detection signal according to a predetermined frequency characteristic, and outputting a first processing signal; an operation section for receiving the first processing signal, performing convolution with the first processing signal and a predetermined transfer function, and outputting a second processing signal; and a multiplying section for receiving the second processing signal and the error signal, multiplying the second processing signal by the error signal, and outputting an update signal for updating coefficients of the adaptive filter to the adaptive filter, the predetermined frequency characteristic and the predetermined transfer function being determined based on a control transfer characteristic from the control loudspeaker to the error detector.

22 Claims, 19 Drawing Sheets

NOISE CONTROL SYSTEM AND METHOD

BACKGROUND OF INVENTION

1. Field of the Invention

The present invention relates to a noise control system and method of operation. More specifically, the present invention relates to an active noise control system and a method which cancels a noise by generating a control sound.

2. Description of the Related Art

By generating a sound (control sound) having the same frequency and amplitude as the noise but at a 180° shifted phase from the noise sounds from a loudspeaker, the noise can be canceled. Because the control sound interferes with the noise and cancels the noise in the region where the control sound is generated (usually, at a listening position). Such a noise control method is called an active noise control. Unlike conventional noiseproofing methods, the active noise control does not require a cover to the noise source (such as an engine) with noise absorption material or to block out noise with a noise insulation material. Consequently, it has the advantages of being able to make the entire sound control system lighter and smaller.

In order to effectively cancel a noise with an active noise control system, the control sound adapted to the noise must be precisely generated. A practical active noise control could not have been created until the development of appropriate algorithms and signal processing technologies. With the recent development of digital signal processing technologies, practical active noise control systems have been proposed.

FIG. 17 schematically shows an example of noise control by a conventional noise control system 700. The configuration of the conventional noise control system 700 and the noise control method using the system 700 will be described below with reference to the relevant drawings.

FIG. 17 illustrates the case of canceling a noise in the region P (noise control area) by generating a control sound from a loudspeaker 704 of the noise control system 700 when the noise travels from a noise source 701.

The noise from the noise source 701 (with the characteristic N) reaches the region P via a transfer function G. At the same time, the information of the noise source 701 is detected by a noise detector 702 (with transfer function M) of the noise control system 700. The detected noise is applied to an adaptive filter 703 ( with transfer function H) as a detection signal. The adaptive filter 703 performs an adaptive processing on the detection signal so as to produce a control signal. The control signal is radiated from a control loudspeaker 704 (with transfer function S) as a control sound, and the control sound reaches the region P via a control transfer characteristic (with transfer function C) including a loudspeaker characteristic S.

The control sound and the noise are synthesized in the region P, and if the control sound is optimized, the entire noise in principle is canceled. However, in reality, there is a residual error as shown in Expression (1), due to the fluctuations of the respective transfer characteristics or the like.

$$\text{residual error} = \text{noise} + \text{control sound} \quad (1)$$

The residual error is detected by an error detector (an error microphone) 705 (with transfer function E) and applied to a multiplier 706 as an error signal e. The error signal e can be expressed by Expression (2) using transfer characteristics (transfer functions) of each system.

$$e = (N*G + N*M*H*C)*E \quad (2)$$

The coefficients of the adaptive filter 703 (i.e., transfer function H) are corrected so that the error signal e is minimized. The filter coefficients are corrected with a coefficient update vector ΔH given by the multiplier 706. The multiplier 706 calculates the coefficient update vector ΔH based on the error signal e and a reference input X using the LMS (Least Mean Square) algorithm.

As the reference input X, instead of directly using the noise detection signal detected by the noise detector 702, the noise detection signal is used after passing through an operator 707 (with filter coefficients, i.e., transfer function C′). The transfer function C′ is set by simulating the predetermined control system transfer function C. Specifically, the transfer function C′ is set so as to be an inverse transfer function having the same frequency-amplitude characteristic as the transfer function C but at a 180° shifted phase from the transfer function C. The frequency characteristic and the impulse response of the operator 707 is shown in FIGS. 18 and 19, respectively. By using the noise detection signal through the operator 707, the phase of the reference signal X matches that of the error signal e, and thus, the coefficient calculation of the adaptive filter 703 can be correctly converged.

The transfer function of the adaptive filter 703 is given by Expression (3) by considering the left side of Expression (2) as nearly equal to 0.

$$H \approx -G/(M*C) \quad (3)$$

By successively updating the coefficients of the adaptive filter 703, the transfer function H can be updated to follow the changes of each transfer function, and thereby the noise control effects can be maintained.

However, since a conventional noise control system as described above, has to perform a significant amount of operation processing in the multiplier 706, large hardware is required to calculate the coefficients of the adaptive filter 703. For instance, the operator 707 is composed of a digital filter having a tap length of 128 as shown in FIG. 19. This is because the lower sound range of a transfer characteristic can not be reproduced by the operator 707 if the number of the taps in the operator 707 is insufficient. Extra noise is thereby disadvantageously added or diverged. It also increases the cost of the system compared with noise absorption or noise insulation materials.

Moreover, when the control loudspeaker 704 is placed apart from the error detector 705, the following problems are caused. In such a case where an intervening object is placed between the control loudspeaker 704 and the error detector 705, or the surroundings are changed after determining the transfer function C of the control loudspeaker 704 to the error detector 705 and setting the inverse transfer function C′ at the operator 707, the transfer characteristic is affected by the intervening object and develops many peaks and dips. The coefficients of the adaptive filter 703 cannot follow such a large change of the transfer characteristics and sufficient noise control effects can not be obtained.

SUMMARY OF THE INVENTION

The noise control system of this invention includes: a noise detector for detecting a noise generated from a noise source to output a noise detection signal; an adaptive filter portion for outputting a control signal based on the noise detection signal to cancel the noise; a control loudspeaker for receiving the control signal to radiate a control sound to a predetermined region; and an error detector for detecting a residual error of the noise and the control sound in the predetermined region, wherein the adaptive filter portion comprises: an adaptive filter for receiving the noise detection signal and processing the noise detection signal to output a control signal; IIR filter means for receiving the noise detection signal, performing a filtering process to the noise detection signal according to a predetermined frequency characteristic, and outputting a first processing signal; operation means for receiving the first processing signal, performing convolutions with the first processing signal and a predetermined transfer function, and outputting a second processing signal; and multiplying means for receiving the second processing signal and the error signal, multiplying the second processing signal by the error signal, and outputting an update signal for updating coefficients of the adaptive filter to the adaptive filter, the predetermined frequency characteristic and the predetermined transfer function being determined based on control transfer characteristics from the control loudspeaker to the error detector.

According to another aspect of the invention, the noise control system includes: a noise detector for detecting a noise generated from a noise source and to output a noise detection signal; an adaptive filter portion for outputting a control signal based on the noise detection signal sent to cancel the noise; a control loudspeaker for receiving the control signal to radiate a control sound to a predetermined region; and an error detector for detecting the residual error of the noise and the control sound in the predetermined region, wherein the system further comprises filter control means for outputting a coefficient adjustment signal to control the adaptive filter portion, and the adaptive filter portion comprises: an adaptive filter for receiving the noise detection signal and processing the noise detection signal to output a control signal; an adaptive IIR filter means for receiving the noise detection signal, performing a filtering process to the noise detection signal according to the frequency characteristic that is determined based on the coefficient adjustment signal, and outputting a first processing signal; operation means for receiving the first processing signal and performing convolution with a predetermined transfer function, and the first processing signal to output a second processing signal, the predetermined transfer function being determined on a control transfer characteristic from the control loudspeaker to the error detector; and multiplying means for receiving the second processing signal and the error signal, multiplying the second processing signal by the error signal, and outputting an update signal for updating coefficients of the adaptive filter to the adaptive filter.

According to another aspect of the invention, the active noise control method for canceling a noise with a control sound, the method includes: a step of detecting a noise generated from a noise source to produce a noise detection signal; a signal processing step of subjecting the noise detection signal to a filtering process with predetermined filter coefficients and producing a control signal to cancel the noise; a step of radiating the control signal from a control loudspeaker to a predetermined region as a control sound; and a step of detecting the residual error of the noise and the control sound in the predetermined region so as to produce an error signal, wherein the signal processing step includes the steps of: subjecting the noise detection signal to a filtering process with a predetermined frequency characteristic to produce a first processing signal; performing convolutions with the first processing signal and a predetermined transfer function to produce a second processing signal; multiplying the second processing signal by the error signal to produce an updating signal for updating the predetermined filter coefficients; and processing the noise detection signal with filter coefficients modified by the update signal to produce a control signal, the predetermined frequency characteristics and the predetermined transfer functions being determined based on control transfer characteristics from the control loudspeaker to the predetermined region.

Thus, the invention described herein makes possible the advantages of (1) providing a reliable noise control system by which sufficient noise control effects can be obtained even with small sized hardware, and which does not add or diverge any extra noise, and (2) providing reliable noise control system and method which are fully adaptable even when there is a change in the transfer characteristics of the control system, and which do not add or diverge any extra noise.

These and other advantages of the present invention will become apparent to those skilled in the art upon reading and understanding the following detailed description with reference to the accompanying figures.

DESCRIPTION OF THE PREFERRED EMBODIMENT

The present invention will be described by way of examples with reference to the accompanying drawings.

EXAMPLE 1

The configuration of a noise control system 100 and the noise control method using the system 100 will be described below with reference to the relevant figures in a first example of the invention.

Figure 1:
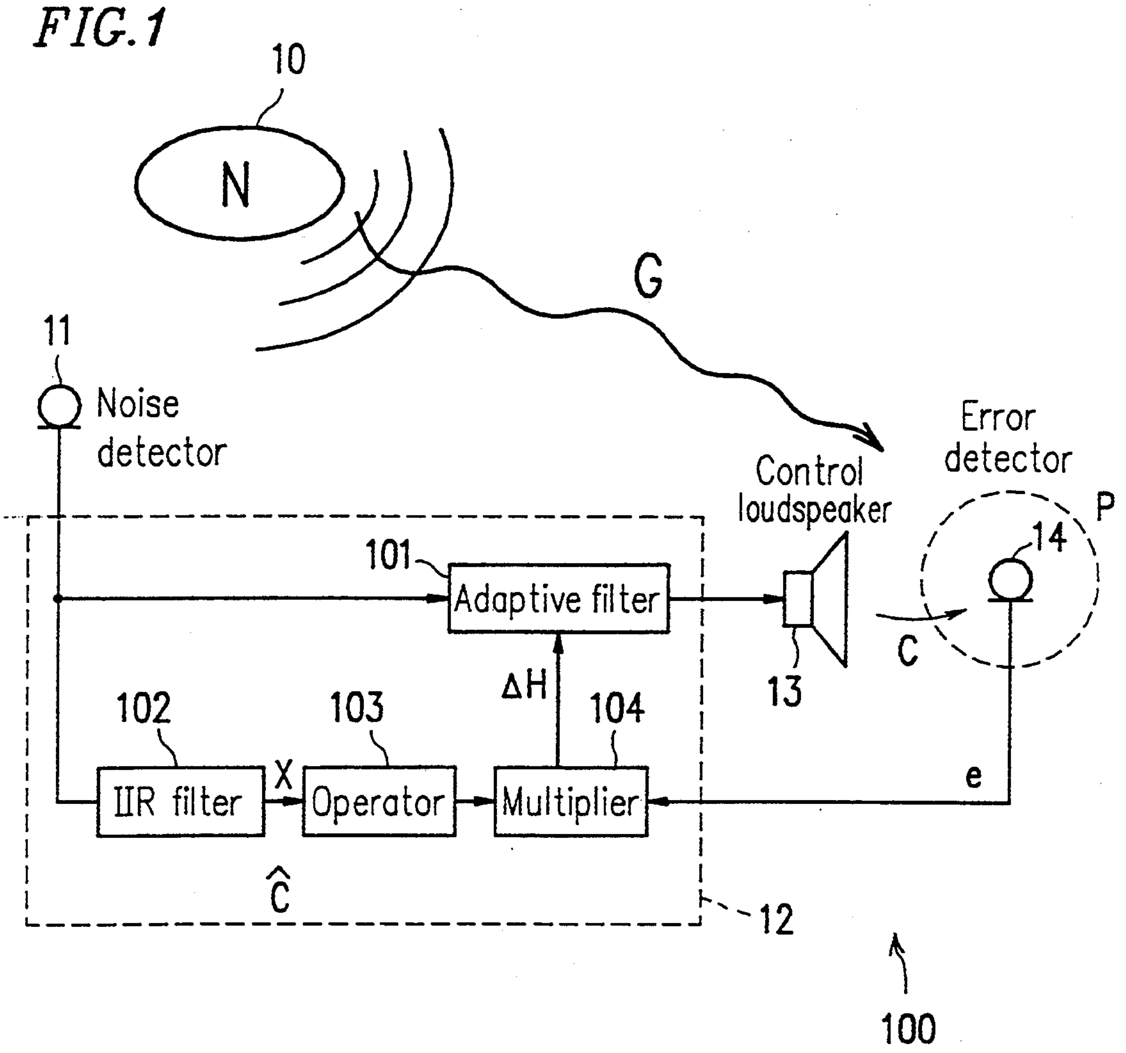
FIG. 1 is a block diagram showing a noise control system in the first example according to the present invention.

As shown in FIG. 1, the noise control system 100 comprises a noise detector 11 for detecting the noise information of a noise source 10, an adaptive filter portion 12 for generating a control signal to control the noise in accordance with the detected noise signal, a control loudspeaker 13 for radiating the control signal as a control sound, and an error detector 14 for detecting the residual error in a region P. The adaptive filter portion 12 comprises an adaptive filter 101, an IIR filter 102 for setting and updating the coefficients of the adaptive filter 101, an operator 103, and a multiplier 104.

The noise detector 11 may be a signal input device which directly receives the noise information from the noise source as an electric signal, or may be a microphone for collecting and detecting the noise. Although, a microphone is used for the error detector 14 in this example, other devices may be used under different circumstances.

A noise generated by the noise source 10 and a control sound generated by the control loudspeaker 13, are synthesized in the region P (noise control area). In principle, the entire noise in the region P is canceled if the control sound is optimized. However, in reality, there is a residual error in the region P due to the temporal fluctuation of respective transfer characteristics or the like. The error detector 14 detects the residual error and applies an error signal e to the multiplier 104. The multiplier 104 updates the coefficients of the adaptive filter 101 so as to minimize the error signal e. The error signal e can be expressed by Expression (4) using the transfer characteristics (transfer functions) of each system.

$$e=(N*G+N*M*H*C*)*E \quad (4)$$

Wherein, N denotes the characteristic of the noise source 10, G denotes the noise system transfer function from the noise source 10 to the region P, M denotes the characteristic (transfer function) of the noise detector 11, H denotes the transfer function of the adaptive filter 101, C denotes the transfer function (including the characteristic S of the control loudspeaker 13) of the control system, and E denotes the characteristic (transfer function) of the error detector 14. The operator * denotes convolution.

The adaptive filter portion 12 of the noise control system 100 will be described in detail below.

The noise information of the noise source 10 detected by the noise detector 11 is applied to the adaptive filter 101 and the IIR filter 102 as a noise detection signal. The adaptive filter 101 processes the noise detection signal in accordance with the filter coefficients set by the multiplier 104 and generates a control signal, applying it to the control loudspeaker 13.

Figure 2:
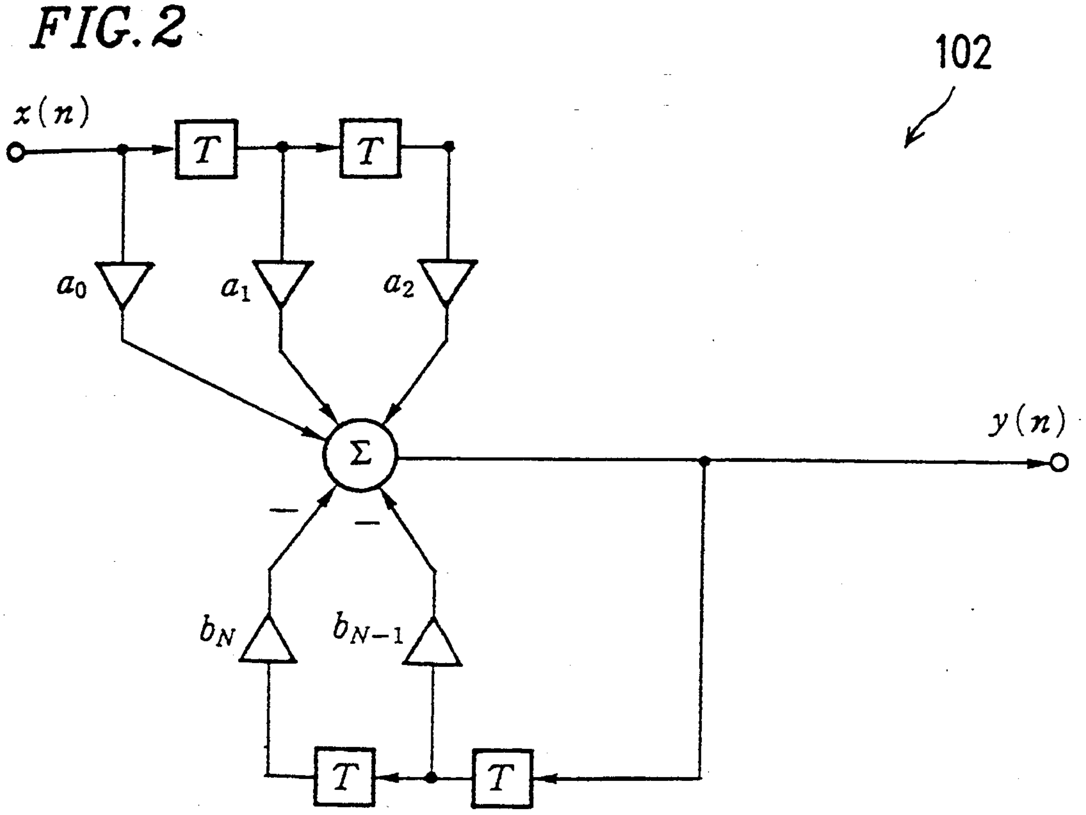
FIG. 2 shows an exemplary IIR filter.
Figure 3:
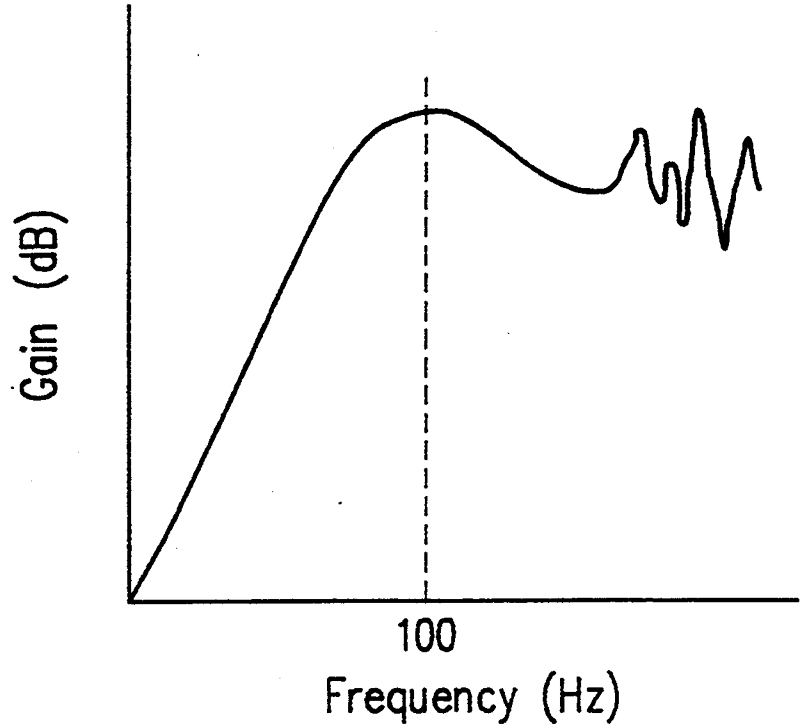
FIG. 3 is a diagram showing the frequency characteristic of the transfer function of the control system in a first example according to the present invention.
Figure 4:
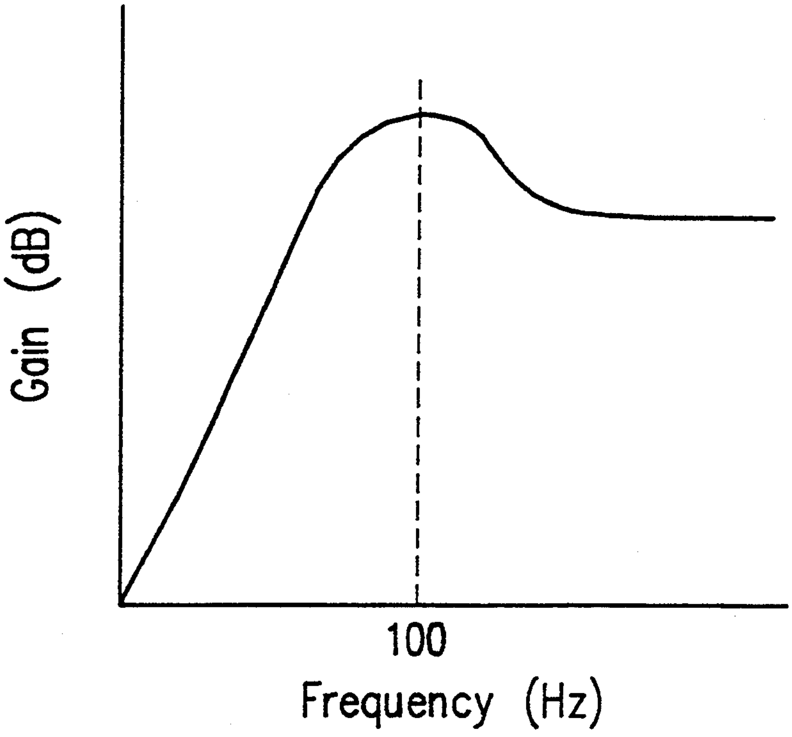
FIG. 4 is a diagram showing the frequency characteristic of the IIR filter in the first example according to the present invention.

The noise detection signal is also applied to the IIR filter 102. An example of the configuration of the IIR filter 102 is shown in FIG. 2. In this example, a biquadratic two-stage IIR filter is used. In such a case, the amount of operation of the IIR filter is equivalent to the amount of operation of an FIR filter with a dozen taps. The frequency characteristic (transfer function) of the IIR filter 102 is set so as to match the characteristic (transfer function C) of the control system in the range of frequency equal to or lower than the predetermined frequency $f_0$. It is preferable that the predetermined frequency $f_0$ is the lowest resonance frequency of the control loudspeaker 13. FIG. 3 illustrates an example of the transfer characteristic (transfer function C of the control system) from the control loudspeaker 13 to the error detector 14. FIG. 4 illustrates an example of the frequency characteristic of the IIR filter 102. As can be seen from FIGS. 3 and 4, the frequency characteristic of the IIR filter 102 substantially matches the control system transfer function C in the range of frequency equal to 100 Hz or lower.

Figure 5:
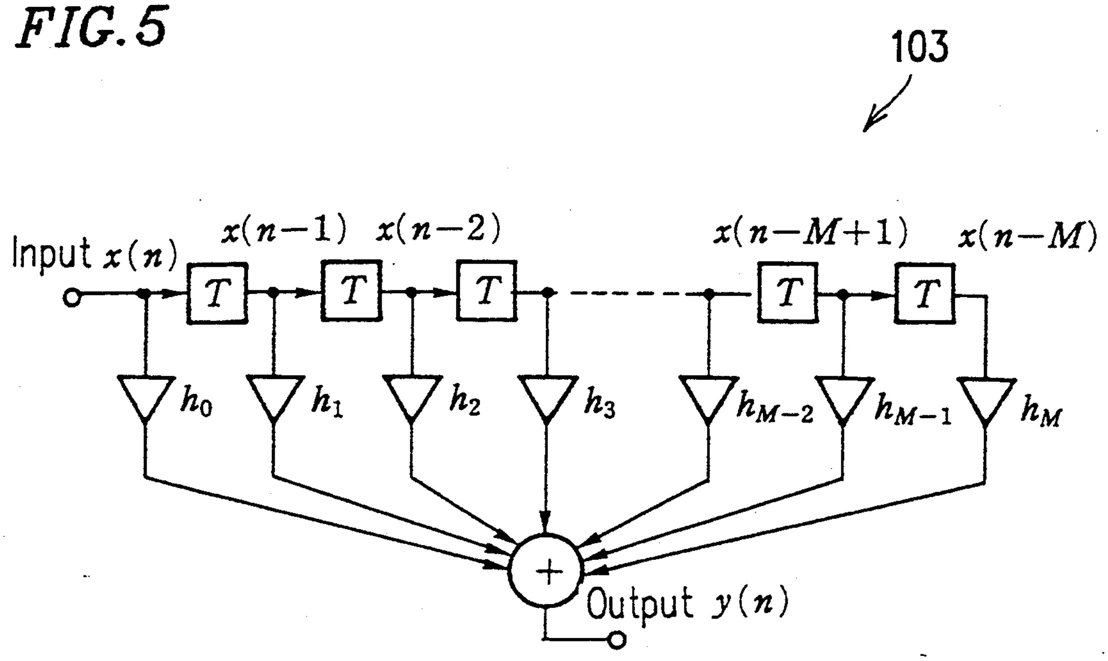
FIG. 5 shows an exemplary FIR filter.
Figure 6:
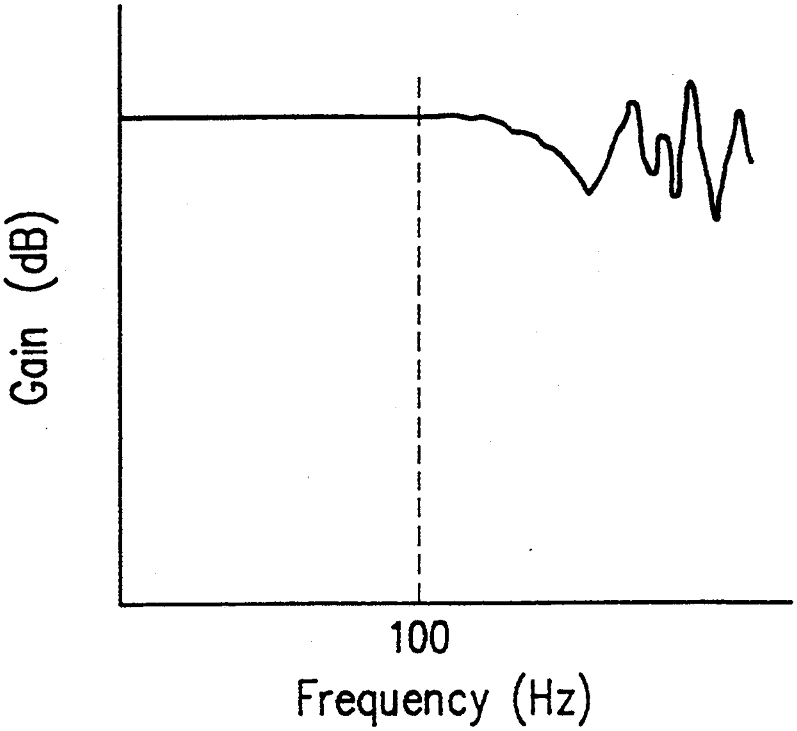
FIG. 6 is a diagram showing the frequency characteristic of the operator in a first example according to the present invention.

The signal having been subjected to a filtering process by the IIR filter 102 is applied to the operator 103. The operator 103 can be implemented by an FIR filter. An example of an FIR filter implementing the operator 103 is shown in FIG. 5. FIG. 6 illustrates the frequency characteristic C'' of the operator 103. When compared with the frequency characteristic C of the control system transfer function shown in FIG. 3, it is seen that C'' reproduces the same frequency characteristic as that of C in the range of frequency equal to or higher than the predetermined frequency $f_0$.

Figure 7:
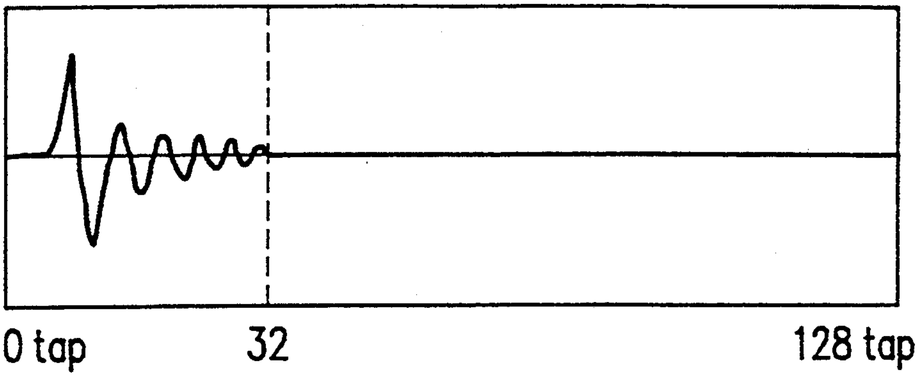
FIG. 7 is a diagram showing an impulse response of the operator in a first example according to the present invention.
Figure 19:
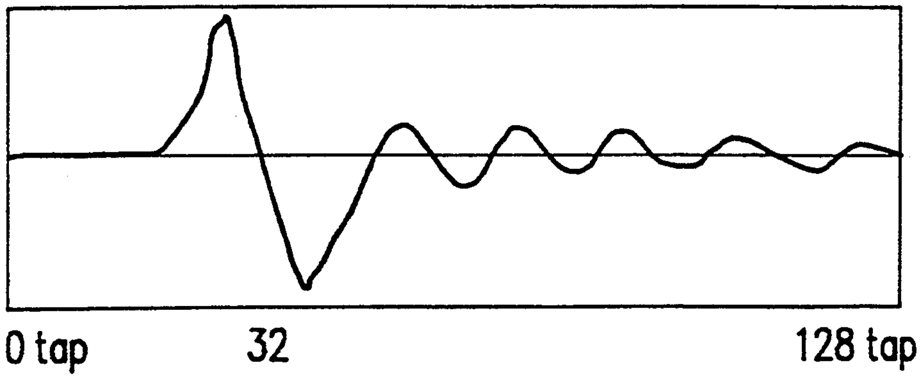
FIG. 19 is a diagram showing fan impulse response of the operator in the conventional noise control system.

The impulse response of the operator 103 is shown in FIG. 7. From FIG. 7, it is understood that the frequency characteristic necessary for the operator 103 is realized with 32 taps. This is because the characteristics in the lower frequency side are realized by the IIR filter 102. For comparison, referring to FIG. 19 which shows the impulse response of the operator 707 in the conventional noise control system 700, it is understood that the operator 707 needs 128 taps to obtain the necessary frequency characteristic.

By setting the frequency characteristic of the IIR filter 102 as shown in FIG. 1, and using a hybrid configuration where the IIR filter 102 is connected to the operator 103 in series, the noise control effects that are equivalent to the conventional operator 707 can be obtained even if the number of the taps in the operator 103 is considerably reduced.

The output signal of the operator 103 (reference signal X) is applied to the multiplier 104. The multiplier 104 multiplies the reference signal X by the error signal e given by the error detector 14 and applies the result to the adaptive filter 101 as a coefficient update signal (update vector ΔH). For a coefficient updating algorithm, for instance, the normalized LMS algorithm or the like can be used (e.g., see "*The Applications of Digital Signal Processing*", pp. 219 ff., Corona Co., The Institute of Electronics, Information and Communication Engineers).

Figure 8:
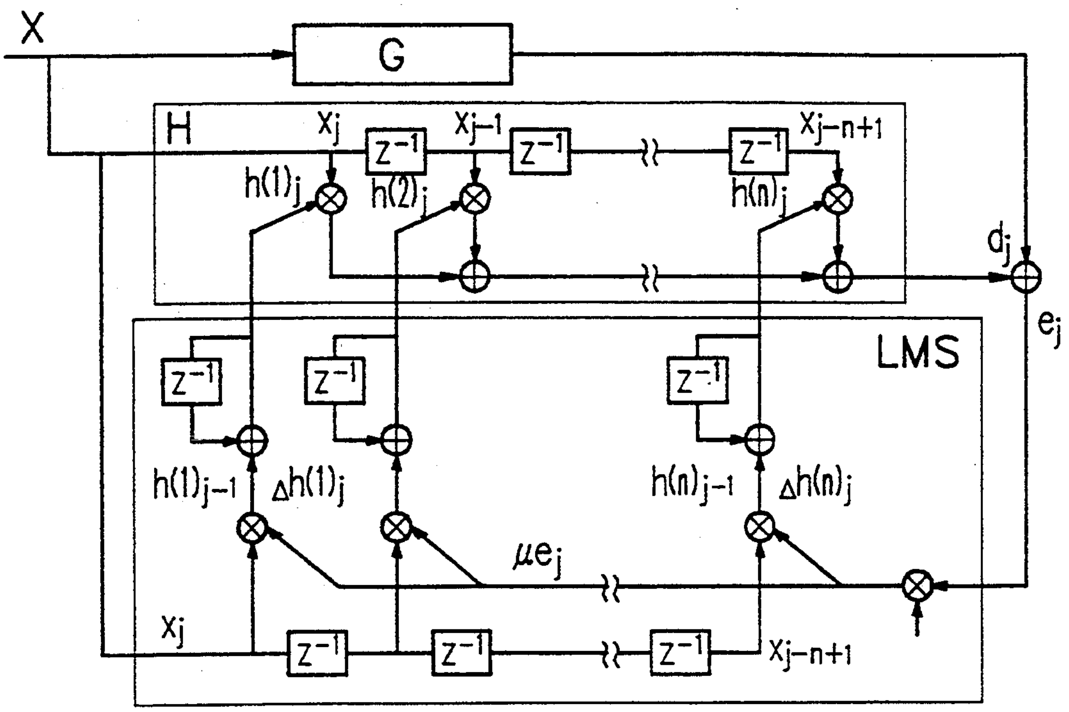
FIG. 8 is a block diagram showing an LMS algorithm in the multiplier.

FIG. 8 is a block diagram illustrating the LMS algorithm. The update vector ΔH is determined so that an input signal series $X_j$ processed by an adaptive filter with coefficients of $H_j$ cancels a signal series $d_j$ which came via a plant system G (transfer characteristic G), whereby the power of the error signal e is minimized. As an evaluation function, $e^2$ is used. By calculating the amount of change (differential coefficient) of the evaluation function $e^2$ with regard to the filter coefficients $H_j$ and multiplying the amount of change by the negative proportional constant, the update vector ΔH can be defined recursively in the direction toward which the evaluation function $e^2$ always decreases (Expression (5)).

$$\begin{aligned}\Delta H &= -\mu' \cdot (\partial e^2/\partial H_j) \\ &= -2\mu' \cdot e_j \cdot (\partial(e_j - X_j^t \cdot H_j)/\partial H_j) \\ &= \mu \cdot e_j \cdot X_j\end{aligned} \tag{5}$$

Wherein, $\mu$ and $\mu'$ are proportional constants and ∂. . /∂. . represents partial differential. The input signal row vector of the past n samples are represented with $X_j$:

$$X_j = (X_j, X_{j-1}, \ldots, X_{j-n+1}) \tag{6}$$

The vector representing filter coefficients of n taps is represented with $H_j$:

$$H_j = (h_j(1), h_j(2), \ldots, h_j(n)) \tag{7}$$

Accordingly, the coefficients $H_{j+1}$ of the adaptive filter at time j+1 is expressed by Expression (8).

$$\begin{aligned}H_{j+1} &= H_j + \Delta H \\ &= H_j + \mu \cdot e_j \cdot X_j\end{aligned} \tag{8}$$

Therefore, the update vector ΔH is calculated by multiplying the input signal series $X_j$ by both the error signal $e_j$ and the converging constant $\mu$, then summing up the vectors by each tap. The update vector ΔH eventually reaches 0 along with the error signal e and H converges to coefficients which represent the characteristic G of the plant system.

Figure 9:
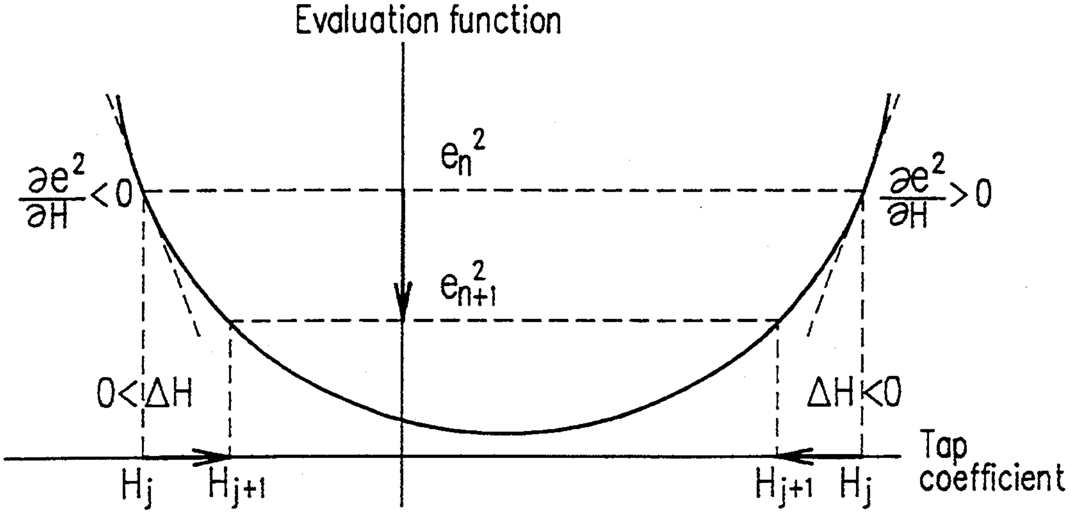
FIG. 9 is a diagram showing a method for updating the coefficients of the adaptive filter.

FIG. 9 illustrates the above-described operation in the case where the number of the tap is 1. The evaluation function becomes a U-shaped quadric function. In the case where the differential coefficient at time j is positive, the amount of update vector ΔH becomes negative, and the evaluation function $e_{j+1}^2$ for the coefficients $H_{j+1}$ decreases under $e_j^2$. 2 In the case where the differential coefficient is negative, since the amount of update vector ΔH becomes positive, the evaluation function $e_{j+1}^2$ also becomes smaller than $ej^2$.

Figure 10:
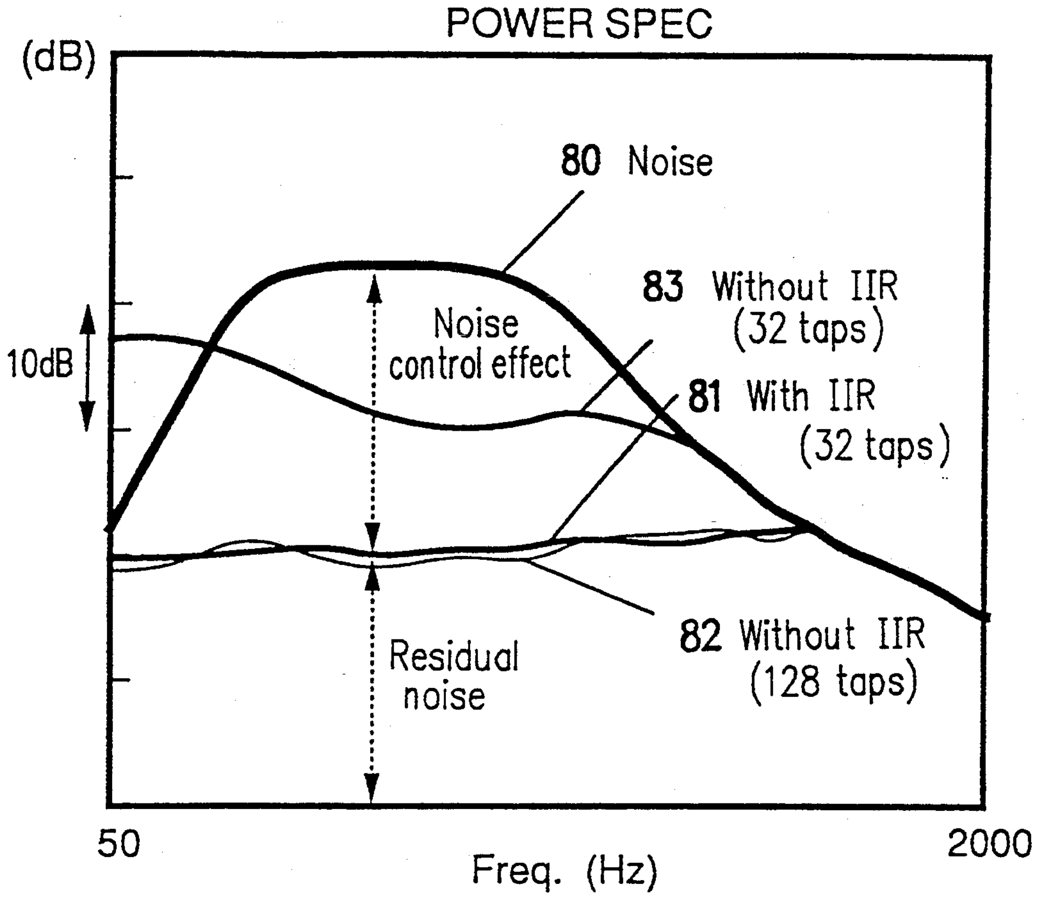
FIG. 10 is a diagram showing a noise canceling effect of the noise control system in the first example according to the present invention.

The effects of the noise control system 100 which is configured as described hereinbefore is shown in FIG. 10. Curve 80 denotes the frequency characteristic of the noise. Curve 81 denotes the noise control effects by the system 100 of this example using the IIR filter 102 and the operator 103 having 32 taps. For the purpose of comparison, the noise control effects in the case of using conventional 128-tap operator and 32-tap operator, which do not have IIR filters, are also shown (curves 82 and 83).

As shown in FIG. 10, the noise control effects similar to the conventional operator 707 having 128 taps can be obtained with the operator 103 having 32 taps by adding the IIR filter 102. Noise can be reduced by 20–25 dB at maximum. On the other hand, in the case where the conventional operator 707 having 32 taps is used, not only can effective noise control not be realized, but an extra noise is also added in the lower frequency range. This is because the transfer characteristic in the lower sound range cannot be reproduced due to an insufficient number of taps.

Even if the operator 103 does not have sufficient number of taps, since the transfer characteristic in the lower sound range is compensated for by the effect of the IIR filter 102, noise control can be performed effectively with small sized hardware.

EXAMPLE 2

The configuration of a noise control system 200 and the noise control method using the system 200 in the second example of the invention will be described below.

Figure 11:
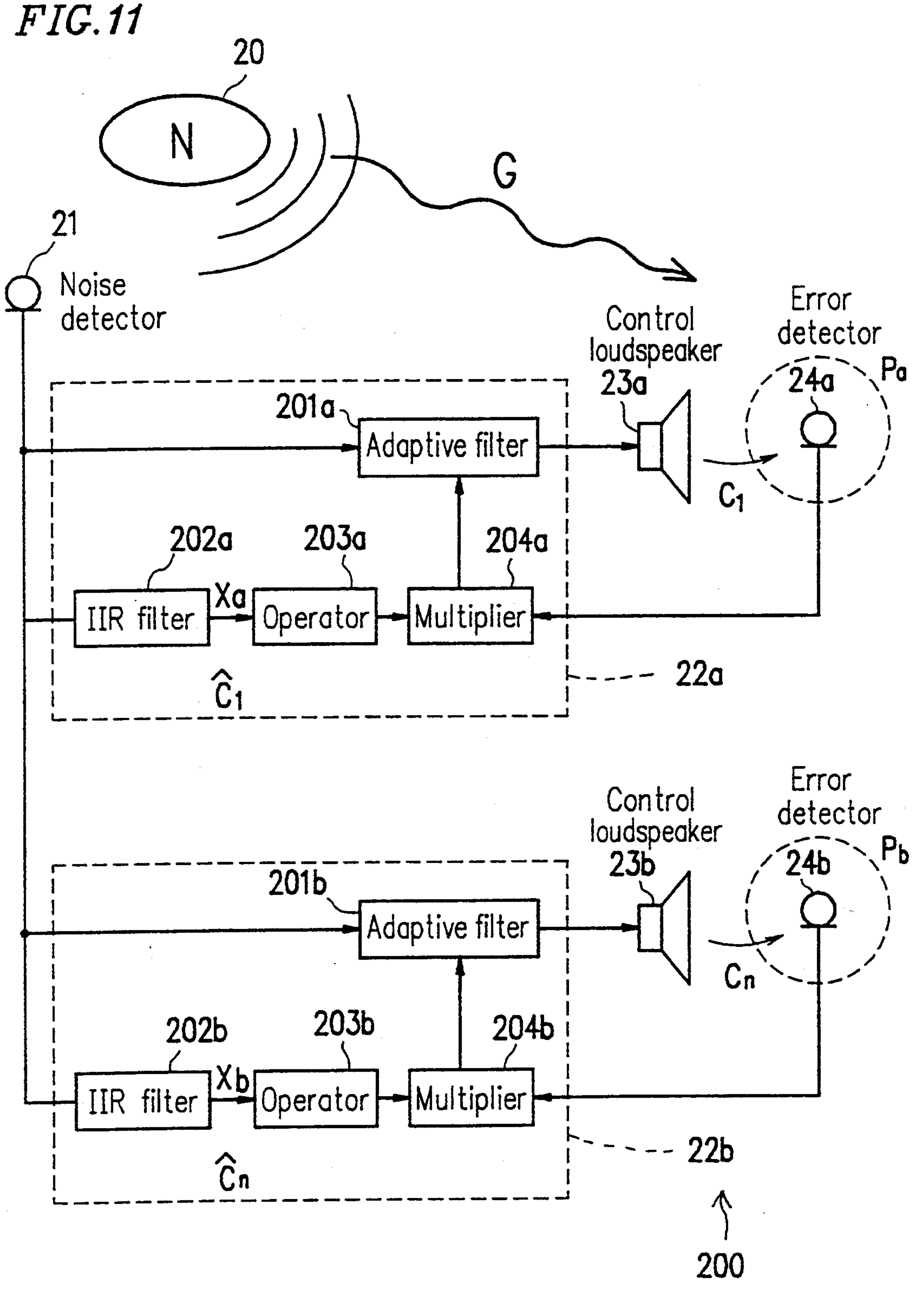
FIG. 11 is a block diagram showing a noise control system in the second example according to the present invention.

The noise control system 200 comprises, as shown in FIG. 11, a noise detector 21 for detecting the noise information of a noise source 20, adaptive filter portions 22*a* and 22*b* for generating control signals to control the noise based on the detected noise signal, control loudspeakers 23*a* and 23*b* for radiating the control signals as control sounds, and error detectors 24*a* and 24*b* for detecting the residual errors in respective regions Pa and Pb.

The adaptive filter portion 22*a* comprises an adaptive filter 201*a*, an IIR filter 202*a* for setting and updating the coefficients of the adaptive filter 201*a*, an operator 203*a*, and a multiplier 204*a*. Similarly, the adaptive filter portion 22*b* comprises an adaptive filter 201*b*, an IIR filter 202*b* for setting and updating the coefficients of the adaptive filter 201*b*, an operator 203*b*, and a multiplier 204*b*.

The configuration of each of these elements are similar to those described in Example 1. The noise control system 200 of this example comprises multiple systems of the set of "an adaptive filter portion, a control loudspeaker, and an error detector" which is described in Example 1. Although an example comprising two systems, as shown in FIG. 11, will be described below, the invention is not limited to this example. Multiple numbers of the detectors 21 can also be provided as required.

The adaptive filter portions 22*a* and 22*b* of the noise control system 200 will be further described in detail.

The noise information of the noise source 20 detected by the noise detector 21 is applied to the respective adaptive filters 201*a* and 201*b* in the filter portions 22*a* and 22*b* as a noise detection signal. The adaptive filters 201*a* and 201*b* process the noise detection signal in accordance with filter coefficients set by the corresponding multipliers 204*a* and 204*b*, generate control signals, and apply them to the control loudspeakers 23*a* and 23*b*, respectively.

The noise detection signal is also applied to the IIR filters 202*a* and 202*b*. The frequency characteristic (transfer function) of the IIR filter 202*a* is set so as to match substantially the transfer characteristic from the control loudspeaker 23a to the error detector 24a (transfer function C1 of the control system) in the range of frequency equal to or lower than the predetermined frequency $f_{10}$ as with the case of the IIR filter 102. It is preferable that the predetermined frequency $f_{10}$ is the lowest resonance frequency of the control loudspeaker 23a. Similarly, the frequency characteristic (transfer function) of the IIR filter 202b is set so as to match substantially the transfer characteristic from the control loudspeaker 23b to the error detector 24b (transfer function C2 of the control system) in the range of frequency equal to or lower than the predetermined frequency $f_{20}$. It is preferable that the predetermined frequency $f_{20}$ is the lowest resonance frequency of the control loudspeaker 23b.

The signal having been subjected to a filtering process by the IIR filter 202a is applied to the operator 203a, and the signal having been subjected to a filtering process by the IIR filter 202b is applied to the operator 203b. Each of the operators 203a and 203b can be implemented by an FIR filter. The frequency characteristic of the operator 203a is set so as to reproduce the characteristic of the control system transfer function C1 in the range of frequency equal to or higher than the predetermined frequency $f_{10}$ as with the case of the operator 103. The frequency characteristic of the operator 203b is similarly set so as to reproduce the characteristic of the control system transfer function C2 in the range of frequency equal to or higher than the predetermined frequency $f_{20}$.

The output signals of the operators 203a and 203b (reference signals $X_a$ and $X_b$) are applied to the multipliers 204a and 204b, respectively. The multiplier 204a multiples the reference signal $X_a$ by the error signal $e_a$ given by the error detector 24a and applies the result of multiplying to the adaptive filter 201a as a coefficient update signal (update vector $\Delta H_a$). Similarly, the multiplier 204b multiplies the reference signal $Xb$ by the error signal $eb$ given by the error detector 24b and applies the result of the multiplying to the adaptive filter 201b as a coefficient update signal (update vector $\Delta H_b$). For an algorithm to update the coefficients, the method used in Example 1 can be used in the same manner.

As described hereinbefore, by setting the frequency characteristics of the IIR filters 202a and 202b so as to be the inverse characteristic of the control system transfer function C in the predetermined frequency range (lower frequency side) and using a hybrid configuration where the operators 203a and 203b are connected to their corresponding IIR filters in series, significant noise control effects can be obtained even if the numbers of the taps in the operators 203a and 203b are considerably reduced. The effect due to the noise control system 200 is similar to the noise control effects shown in FIG. 10.

Since this example performs a so-called "multi-control" in which multiple control loudspeakers and error detectors are used, specific and effective noise control can be attained in a wider region.

In the case where the multi-control is performed, since the amount of operations and the size of the system both increase, a sufficient tap length is not often provided to an operator. Therefore, the present invention, with which sufficient noise control effects can be obtained even if the number of the taps is reduced in the operator, is especially useful.

EXAMPLE 3

The third example of the invention will be described below with reference to the relevant figures.

Figure 12:
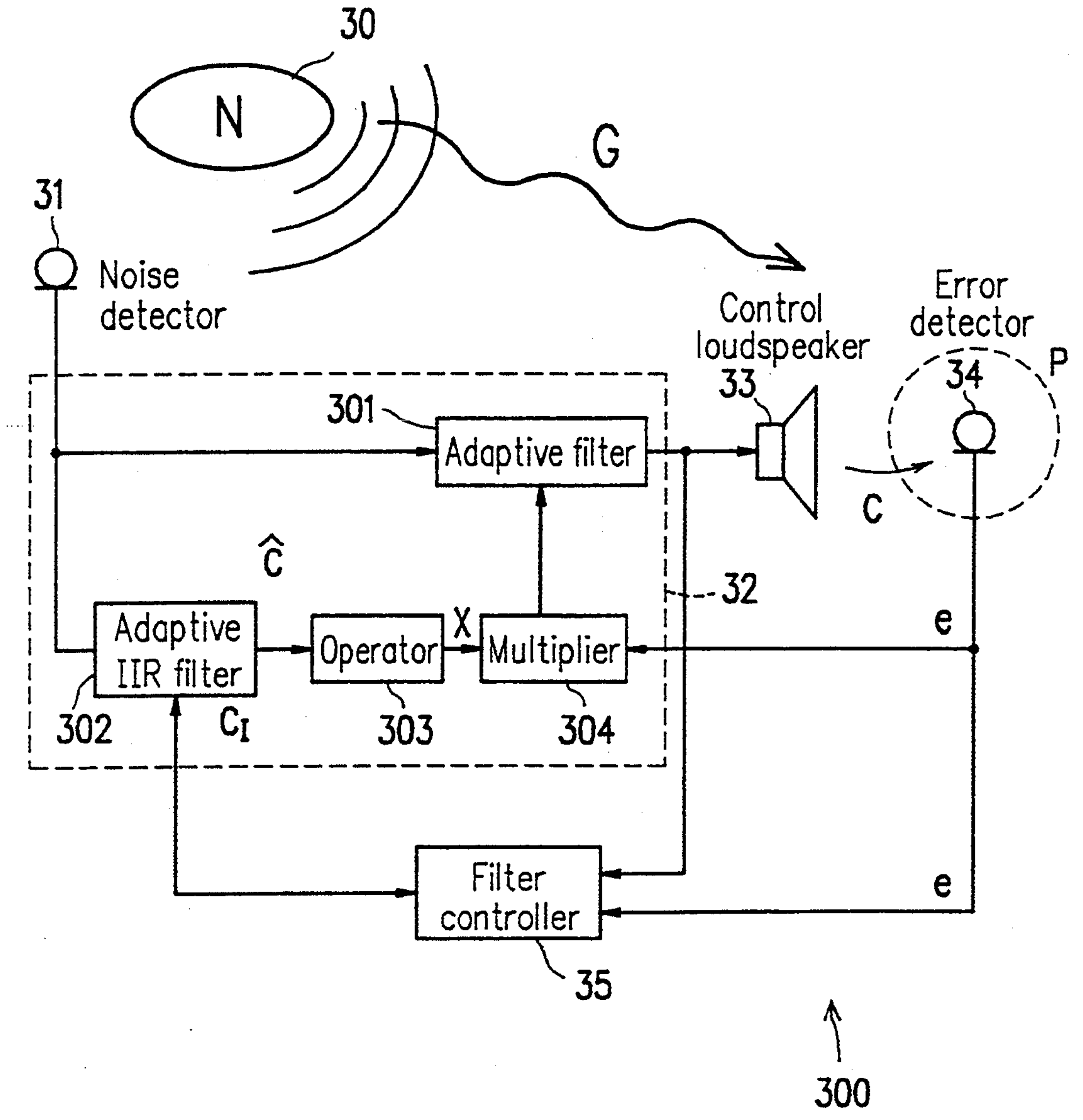
FIG. 12 is a block diagram showing a noise control system in the third example according to the present invention.

FIG. 12 schematically shows a noise control system 300 according to the third example of the invention.

The noise control system 300 comprises, a noise detector 31 for detecting the noise information of a noise source 30, an adaptive filter portion 32 for generating a control signal to control the noise based on the detected noise signal, a control loudspeaker 33 for radiating the control signal as a control sound, an error detector 34 for detecting the residual error in a region P, and a filter control circuit 35. The adaptive filter portion 32 comprises an adaptive filter 301, an adaptive IIR filter 302, an operator 303, and a multiplier 304. The configurations of the noise detector 31, control loudspeaker 33, and error detector 34 are similar to those described in Example 1 and Example 2. By employing the filter control circuit 35 and the adaptive IIR filter 302, this example is fully adaptable to the transfer characteristic C of the control system even when it fluctuates considerably.

The adaptive filter portion 32 and the filter control circuit 35 of the noise control system 300 will be further described in detail below.

The noise information detected by the noise detector 31 is applied to the adaptive filter 301 and the adaptive IIR filter 302 as a noise detection signal.

The adaptive filter 301 processes the noise detection signal in accordance with the filter coefficients set by the multiplier 304 and generates a control signal, then, applying it to the control loudspeaker 33. At the same time, the control signal is also applied to the filter control circuit 35.

The adaptive IIR filter 302 is set so that its frequency characteristic (transfer function $C_I$) matches the transfer characteristic (transfer function C) of the control system from the control loudspeaker 33 to the error detector 34 in the range of frequency equal to or lower than the predetermined frequency $f_0$. The transfer function $C_I$ is set so as to have a 180° shifted phase from the transfer function C of the control system. It is preferable that the predetermined frequency $f_0$ is the lowest resonance frequency of the control loudspeaker 33.

The operator 303 can consist of an FIR filter in the same manner as that of Example 2. The frequency characteristic $C_F$ of the operator 303 is set so as to reproduce the same frequency characteristic as the transfer function C of the control system in the range of frequency equal to the predetermined frequency $f_0$ or higher. The phase of the frequency characteristic $C_F$ is set so as to be shifted by 180° from the transfer function C of the control system. The output signal (reference signal X) of the operator 303 is applied to the multiplier 304.

The noise generated from the noise source 30 is canceled by the control sound radiated from the control loudspeaker 33 in the region P (noise control area). The residual error is detected by the error detector 34 and applied to the multiplier 304 and the filter control circuit 35 as an error signal e.

The multiplier 304 multiplies the reference signal X by the error signal e given by the error detector 34 and applies the result to the adaptive filter 301 as a coefficient update signal (update vector ΔH). The filter coefficients of the adaptive filter 301 are updated so as to lower the error signal e. The update algorithm used at the multiplier 304 is similar to the algorithm described in Example 1.

Figure 13:
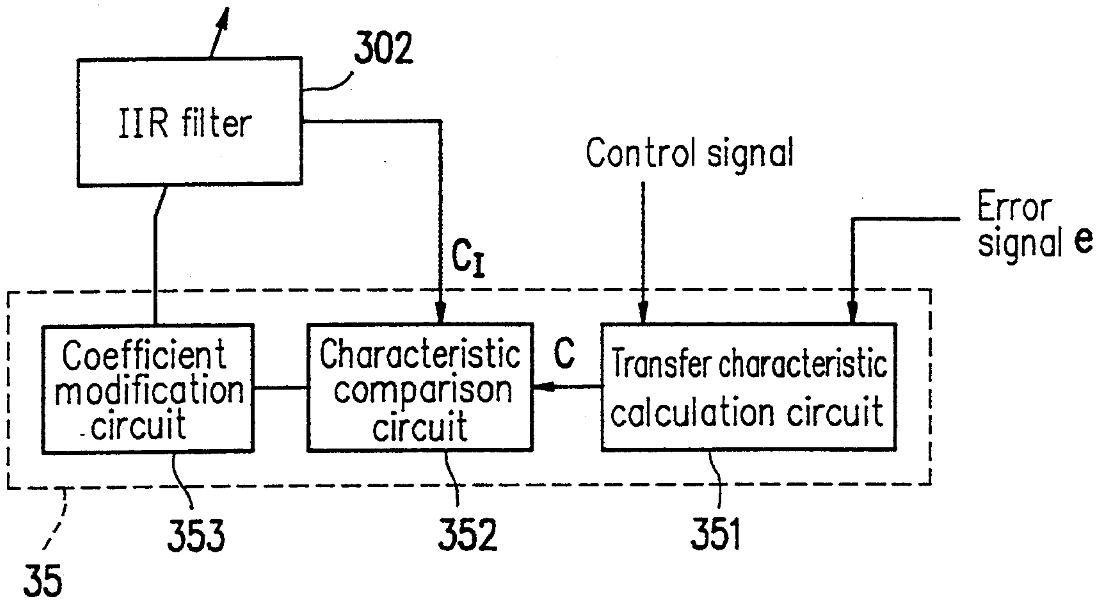
FIG. 13 is a block diagram showing the structure of the filter control circuit.

The filter control circuit 35 comprises, as shown in FIG. 13, a characteristic calculation circuit 351 for receiving the control signal and error signal so as to calculate the transfer function C of the control system in real time, a characteristic comparison circuit 352 for comparing the calculation result of the characteristic calculation circuit 351 with the filter coefficients (transfer function $C_I$) of the adaptive IIR filter 302 to determine the difference therebetween, and a coefficient modification circuit 353 for altering the coefficients of the adaptive IIR filter 302 based on the determined difference.

Using conventional techniques, the characteristic calculation circuit 351 can be implemented by Fourier transformers (or Z transformers) and adders or the like.

Figure 14:
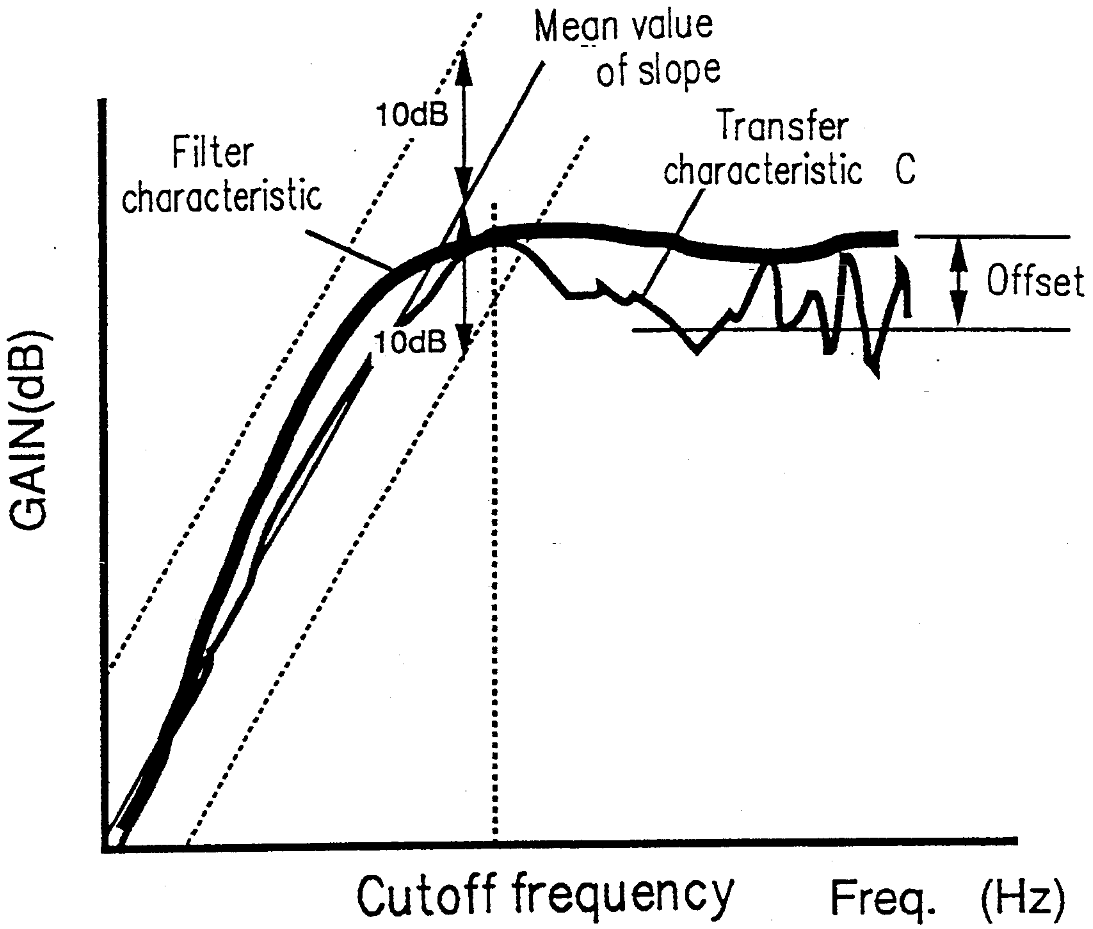
FIG. 14 is a diagram showing a method for comparing the frequency characteristics in the filter control circuit.

The characteristic comparison circuit 352 compares the transfer function C of the control system with the characteristic given by the adaptive IIR filter 302 (referred to as filter characteristic $C_I$ hereinafter). The method of comparing the frequency characteristics is shown in FIG. 14.

The characteristic comparison circuit 352 examines the cutoff frequency $f_I$ of the filter characteristic $C_I$ at first, and determines if the cutoff frequency $f_I$ is in the range within ±30% of the cutoff frequency of the control system (above-described $f_0$, preferably). The result of the determination is applied to the coefficient modification circuit 353. The coefficient modification circuit 353 controls the coefficients of the adaptive IIR filter 302 so that the cutoff frequency $f_I$ is within this range. Then, the characteristic comparison circuit 352 examines the slope of the filter characteristic curve in the range of frequency equal to or lower than the cutoff frequency $f_I$. The characteristic comparison circuit 352 determines if the slope of the filter characteristic is within the predetermined range from the mean value of the slopes of the control system transfer characteristic C. When the slope is out of the predetermined range, the coefficient modification circuit 353 alters the filter characteristic of the adaptive IIR filter 302. For instance, the slope of the filter characteristic curve can be controlled always within the range of ±10 dB from the mean value of the slopes of the control system transfer characteristic curve. The offset in the range of frequency higher than the cutoff frequency $f_I$ does not have to be taken into account because the characteristic in this frequency range is compensated for with the characteristic $C_F$ of the operator 303. These controls can be attained using conventional microcomputer techniques.

According to the noise control system 300 of this example, the system can adapt to the fluctuation of the control transfer characteristic C by using the filter control circuit 35 even when the control transfer characteristic C fluctuates considerably due to an insertion of an intervening object between the control loudspeaker 33 and the error detector 34 after setting the characteristic of the adaptive IIR filter. The noise control system 300 can also adapt to the fluctuation of the control transfer characteristic due to the temporal change of the characteristic of the control loudspeaker 33 or the like. The error on the setting of the filter coefficients H of the adaptive filter 301 (the input of the update vector ΔH) is accordingly reduced, and noises are thereby precisely controlled in the region P under various conditions.

Though only one system of "a control loudspeaker—an error detector" is used in this example, the noise control system 300 of this example is not limited to this configuration. The noise control system 300 may be provided with multiple systems of "a control loudspeaker—an error detector" as shown in Example 2 and can attain the effects similar to those of Example 2.

EXAMPLE 4

A more specific and practical application for the noise control system of this invention will be described in Example 4.

Figure 15A:
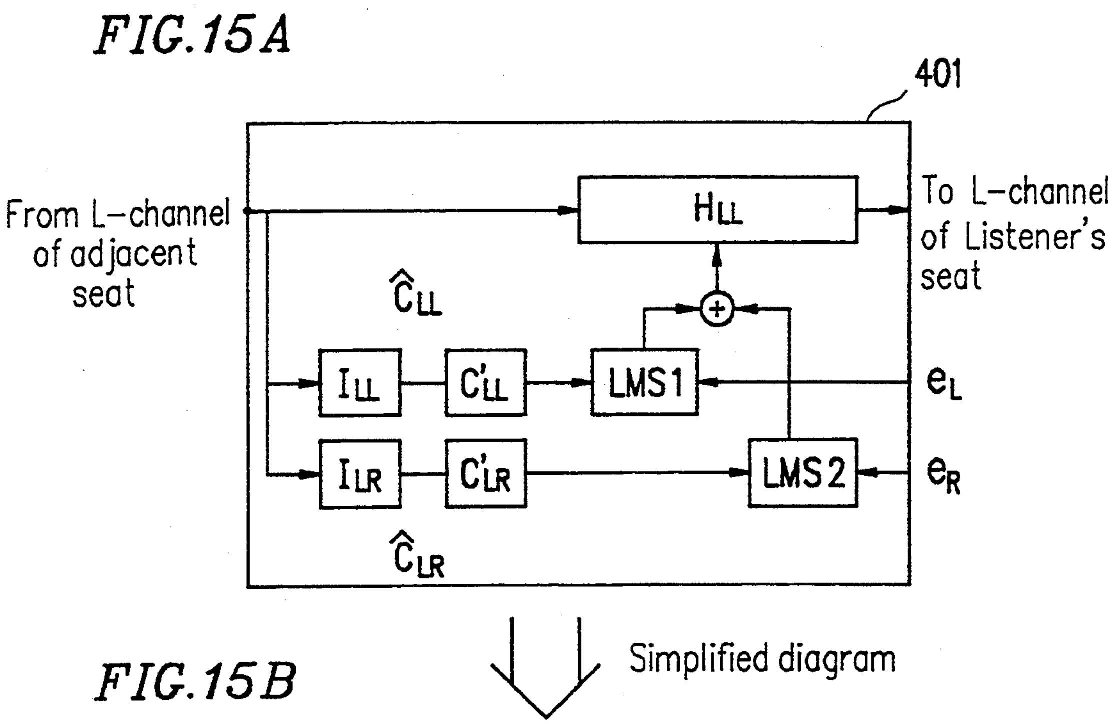
FIG. 15A is a block diagram showing a noise control system in the fourth example according to the present invention.
Figure 15B:
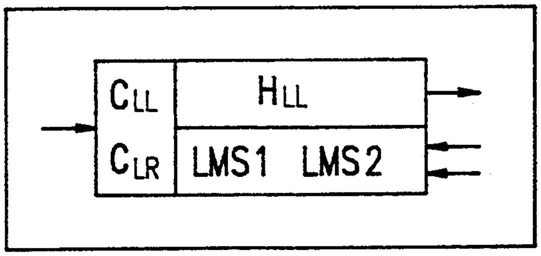
FIG. 15B is a simplified diagram of FIG. A.
Figure 16:
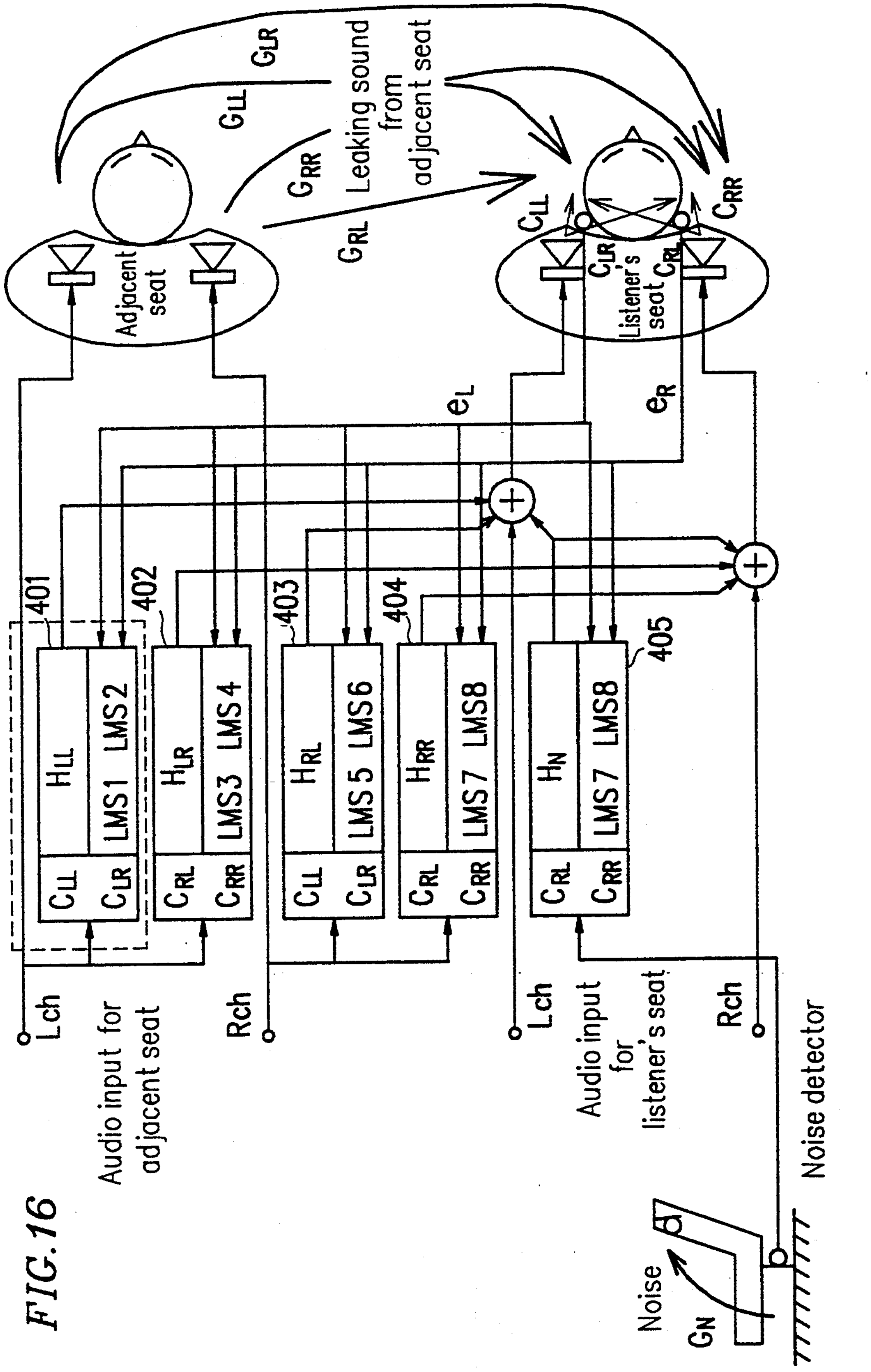
FIG. 16 is a block diagram showing a practical application for the noise control system of the fourth example.
Figure 17:
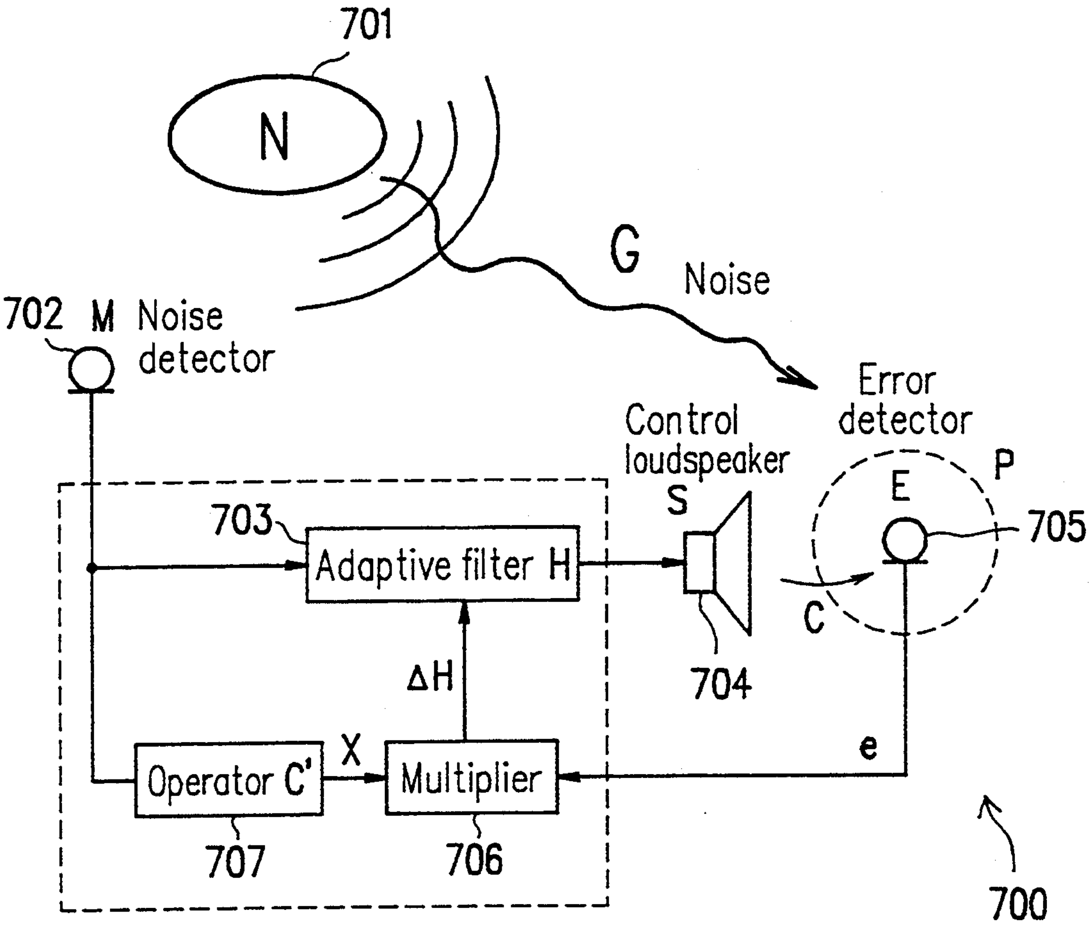
FIG. 17 is a block diagram showing a conventional noise control system.
Figure 18:
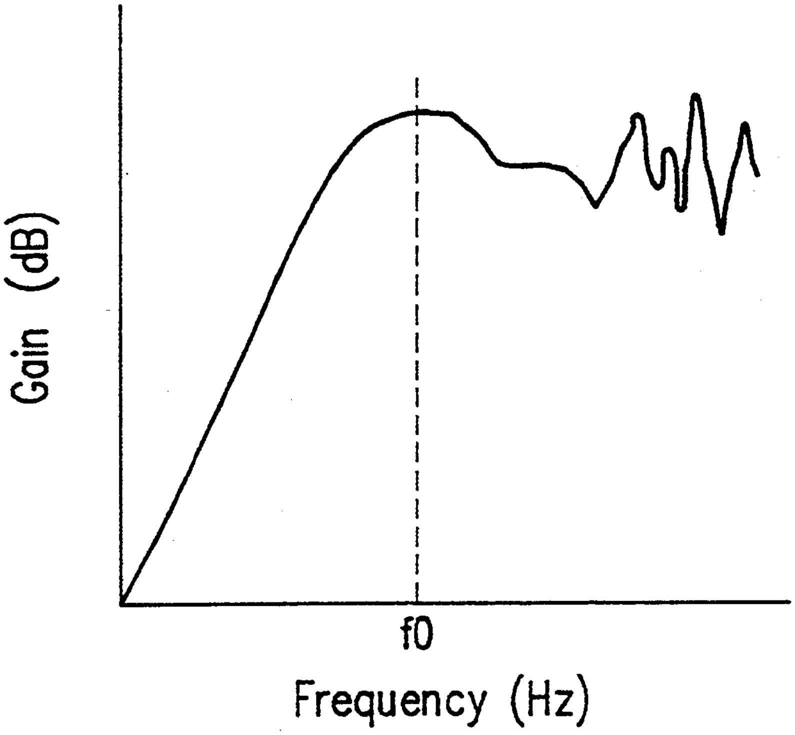
FIG. 18 is a diagram showing the frequency characteristic of the operator in the conventional noise control system.

FIGS. 15A, 15B, and 16 are the views illustrating an application in an audio transfer system in a set of two adjacent seats on a train or the like. Right and left loudspeakers are equipped in the headrest of each seat. The sounds reproduced by the pair of loudspeakers in one seat (listener's seat) are the only sounds for the listener and other sounds reproduced by the loudspeakers of the adjacent seat (i.e., leaking sounds) and the vibration noise of the train or the like are all undesirable noises. The noise controls are performed with two channels in this example.

FIG. 15A illustrates a 2-channel noise control system 401 (referred to as a unit 401 hereinafter). The unit 401 comprises an adaptive filter ($H_{LL}$), IIR filters ($I_{LL}$ and $I_{LR}$), operators ($C_{LL}'$and $C_{LR}'$), and multipliers (LMS1 and LMS2). The subscript LR designates the right loudspeaker on the left seat, and the LL or other notations designate respective locations in the same manner. The description for each element is omitted since they are similar to those described in other examples. For simplicity, the unit 401 is schematically illustrated as shown in FIG. 15B.

FIG. 16 is a block diagram illustrating this system. The leaking sound from the adjacent seat reaches the listener's seat (specifically, the ears of the listener) via transfer functions $G_{LL}$, $G_{LR}$, $G_{RL}$, and $G_{RR}$ corresponding to the four systems. The audio input signal of the adjacent seat is processed by respective units 401–404. For instance, the left channel input signal of the adjacent seat is applied to the unit 401 (adaptive filter $H_{LL}$) and the unit 402 (adaptive filter $H_{LR}$) to produce control signals. The input signal of the right channel is similarly processed. These control signals are added to the audio signals for the listener's seat and reproduced by the loudspeakers in the listener's seat as control sounds. These control sounds reach the listener's ears via the control system transfer functions $C_{LL}$, $C_{LR}$, $C_{RL}$, and $C_{RR}$ to cancel the leaking sounds from the adjacent seat.

A pair of microphones are equipped in the headrest of the listener's seat so as to detect an error of the leaking sounds and the control sounds as a residual error. The coefficients of the adaptive filters $H_{LL}$, $H_{LR}$, $H_{RL}$, and $H_{RR}$ are updated so as to minimize the residual error. For instance, in order to generate a control signal for the leaking sound reaching the area surrounding the listener's left ear from the left loudspeaker of the adjacent seat, the adaptive filters $H_{LL}$ and $H_{LR}$ are used. The coefficients of the adaptive filter $H_{LL}$ which controls the noise via the control system transfer function $C_{LL}$ is updated by the multiplier LMS1. The multiplier LMS1 updates the coefficients based on the left ear area error signal $e_L$ and the left channel input signal (reference signal) of the adjacent seat filtered with the predetermined $I_{LL}$ and $C_{LL}'$. The coefficients of the adaptive filter $H_{LR}$ which controls the noise through the control system transfer function $C_{RL}$ is similarly updated by a multiplier LMS3. The multiplier LMS3 updates the coefficients based on the right ear area error signal $e_R$ and the left channel input signal (reference signal) of the adjacent seat filtered by the predetermined $I_{RL}$ and $C_{RL}'$.

A noise detector is provided beneath the seat to detect various noises. The noise detection signal for these noises is similarly processed by the unit 405 to generate control signals. The control signals are added to the audio signal for the listener's seat and reproduced by the loudspeakers of the listener's seat. Though two systems of the unit 405 can be used like other system configurations of this example, since the noise transfer functions to both of the ears are approximately the same in the lower frequency, only one system of unit 405 is sufficient for the processing.

As the number of the processing systems increases as in this example, obtaining significant noise control effects while scaling down the size of an operator becomes important.

As is obvious from the description hereinabove, according to the noise control systems and methods of the invention, a reliable noise control providing sufficient noise control effects without adding or diverging an extra noise can be performed with a small sized hardware. Moreover, these systems are fully adaptable to the fluctuations of the control system transfer characteristics and can attain a reliable noise control without adding or diverging any extra noise.

According to the noise control systems and methods of the invention, with a hybrid configuration where an IIR filter is connected to an operator in series, the noise control effects similar to those of conventional operators can be attained even if the number of the taps in the operator is considerably reduced. This is because the transfer characteristic in the lower sound range is compensated for by the effect of the IIR filter.

The invention can also control a noise precisely and effectively in a wider region by employing a multi-control where multiple systems of a control loudspeakers and error detectors are used. In many cases where a multi-control is performed, a sufficient number of taps is not often provided to an operator since the amount of operation processing and the size of the system both increase. The present invention, with which sufficient noise control effects can be obtained even if the number of the taps is reduced in the operator, is thus especially useful.

According to the noise control systems and methods of the invention, the systems are adaptable to the fluctuation of the control transfer characteristic by a filter control means even when the transfer characteristic of the control system considerably fluctuates due to an insertion of an intervening object between the control loudspeaker and the error detector after the characteristic of the adaptive IIR filter is set. The systems are also easily adaptable to the control transfer characteristics due to the change of the characteristic of the control loudspeaker or the like. The noise control is thereby performed precisely under various conditions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A noise control system comprising:

a noise detector for detecting a noise generated from a noise source to output a noise detection signal;

an adaptive filter portion for outputting a control signal based on the noise detection signal to cancel the noise;

a control loudspeaker for receiving the control signal to radiate a control sound to a predetermined region; and an error detector for detecting a residual error of the noise and the control sound in the predetermined region, wherein the adaptive filter portion comprises:

an adaptive filter for receiving the noise detection signal and processing the noise detection signal to output a control signal;

IIR filter means for receiving the noise detection signal, performing a filtering process to the noise detection signal according to a predetermined frequency characteristic, and outputting a first processing signal;

operation means for receiving the first processing signal, performing convolution with the first processing signal and a predetermined transfer function, and outputting a second processing signal; and multiplying means for receiving the second processing signal and the error signal, multiplying the second processing signal by the error signal, and outputting an update signal for updating coefficients of the adaptive filter to the adaptive filter, the predetermined frequency characteristic and the predetermined transfer function being determined based on a control transfer characteristic from the control loudspeaker to the error detector.

2. A system according to claim 1, wherein the predetermined frequency characteristic of the IIR filter substantially matches the control transfer characteristic in a first frequency range.

3. A system according to claim 2, wherein the first frequency range is a range of the frequency equal to or lower than the lowest resonance frequency of the control loudspeaker.

4. A system according to claim 1, wherein the predetermined transfer function of the operator substantially matches the control transfer characteristic in a second frequency range.

5. A system according to claim 3, wherein the second frequency range is a range of the frequency equal to or higher than the lowest resonance frequency of the control loudspeaker.

6. A noise control system comprising:

a noise detector for detecting a noise generated from a noise source to output a noise detection signal;

an adaptive filter portion for outputting a control signal based on the noise detection signal to cancel the noise;

a control loudspeaker for receiving the control signal to radiate a control sound to a predetermined region; and an error detector for detecting a residual error of the noise and the control sound in the predetermined region, wherein the system further comprises filter control means for outputting a coefficient adjustment signal to control the adaptive filter portion, and the adaptive filter portion comprises:

an adaptive filter for receiving the noise detection signal and processing the noise detection signal to output a control signal;

an adaptive IIR filter means for receiving the noise detection signal, performing a filtering process to the noise detection signal according to a frequency characteristic determined based on with the coefficient adjustment signal, and outputting a first processing signal;

operation means for receiving the first processing signal and performing convolution with a predetermined transfer function, and the first processing signal to output a second processing signal, the predetermined transfer function being determined based on control transfer characteristic from the control loudspeaker to the error detector; and multiplying means for receiving the second processing signal and the error signal, multiplying the second processing signal by the error signal, and outputting an update signal for updating coefficients of the adaptive filter to the adaptive filter.

7. A system according to claim 6, wherein the predetermined frequency characteristic of the IIR filter substantially matches the control transfer characteristic in a first frequency range.

8. A system according to claim 7, wherein the first frequency range is a range of the frequency equal to or lower than the lowest resonance frequency of the control loudspeaker.

9. A system according to claim 6, wherein the predetermined transfer function of the operator substantially matches the control transfer characteristic in a second frequency range.

10. A system according to claim 8, wherein the second frequency range is a range of the frequency equal to or higher than the lowest resonance frequency of the control loudspeaker.

11. A system according to claim 6, wherein the filter control means comprises:

calculation means for receiving the control signal and the error signal to calculate the control transfer characteristic;

characteristic comparison means for comparing the frequency characteristic of the adaptive IIR filter with the calculated control transfer characteristic; and coefficient modification means for outputting the coefficient adjustment signal based on the result of the comparison of the characteristic comparison means and altering a filter coefficients of the adaptive IIR filter.

12. A system according to claim 11, wherein the characteristic comparison means performs a comparison based on the cutoff frequency of the adaptive IIR filter and the slope of the curve representing the frequency characteristic of the adaptive IIR filter.

13. A system according to claim 12, wherein the coefficient modification means controls the filter coefficients of the adaptive IIR filter so as to keep the cutoff frequency within a predetermined range and to keep the slope of the curve representing the frequency characteristic of the adaptive IIR filter within a predetermined range from the slope of the curve representing the control transfer function.

14. An active noise control method for canceling a noise with a control sound, the method including:

a step of detecting a noise generated from a noise source to produce a noise detection signal;

a signal processing step of subjecting the noise detection signal to a filtering process with predetermined filter coefficients and producing a control signal to cancel the noise;

a step of radiating the control signal from a control loudspeaker to a predetermined region as a control sound; and a step of detecting a residual error of the noise and the control sound in the predetermined region to produce an error signal, wherein the signal processing step includes the steps of:

subjecting the noise detection signal to a filtering process with a predetermined frequency characteristic to produce a first processing signal;

performing convolutions with the first processing signal and a predetermined transfer function to produce a second processing signal;

multiplying the second processing signal by the error signal to produce an updating signal for updating the predetermined filter coefficients; and processing the noise detection signal with filter coefficients modified by the update signal to produce a control signal, the predetermined frequency characteristic and the predetermined transfer function being determined based on a control transfer characteristic from the control loudspeaker to the predetermined region.

15. A method according to claim 14, wherein the predetermined frequency characteristic is set so as to substantially match the control transfer characteristic in a first frequency range.

16. A method according to claim 15, wherein the first frequency range is a range of the frequency equal to or lower than the lowest resonance frequency of the control loudspeaker.

17. A method according to claim 14, wherein the predetermined transfer function is set so as to substantially match the control transfer characteristic in a second frequency range.

18. A method according to claim 16, the second frequency range is a range of frequency equal to or higher than the lowest resonance frequency of the control loudspeaker.

19. A method according to claim 14, wherein the signal processing step includes a control step for modifying the predetermined frequency characteristic based on the control signal and the error signal.

20. A method according to claim 19, wherein the control step includes the steps of:

calculating the control transfer characteristic based on the control signal and the error signal;

comparing the predetermined frequency characteristic with the calculated control transfer characteristic;

producing a characteristic adjustment signal based on the result of the step of comparing to the control the predetermined frequency characteristic; and the step of modifying the predetermined frequency characteristic based on the characteristic adjustment signal.

21. A method according to claim 20, wherein a comparison is performed based on the cutoff frequency of the frequency characteristic and the slope of the curve representing the frequency characteristic in the step of comparing.

22. A method according to claim 21, wherein the cutoff frequency of the frequency characteristic is kept within a predetermined range and the slope of the curve representing the frequency characteristic is kept within a predetermined range from the slope of the curve representing the control transfer function by altering the predetermined frequency characteristic in modifying step.

* * * * *